(12) United States Patent
Lundgren-Goodman et al.

(10) Patent No.: US 12,378,032 B2
(45) Date of Patent: Aug. 5, 2025

(54) COMPOSITE PAPERBOARD CONTAINER WITH A RIM COMPRISING FIBERS, AND A METHOD FOR PRODUCING SUCH A CONTAINER

(71) Applicant: GPI Systems AB, Lund (SE)

(72) Inventors: Maximillian Lundgren-Goodman, Lomma (SE); Georg Gezelius, Malmo (SE)

(73) Assignee: GPI Systems AB, Lund (SE)

(*) Notice: Subject to any disclaimer, the term of this patent is extended or adjusted under 35 U.S.C. 154(b) by 59 days.

(21) Appl. No.: 18/033,597

(22) PCT Filed: Oct. 14, 2021

(86) PCT No.: PCT/SE2021/051010
§ 371 (c)(1),
(2) Date: Apr. 25, 2023

(87) PCT Pub. No.: WO2022/093090
PCT Pub. Date: May 5, 2022

(65) Prior Publication Data
US 2023/0399140 A1  Dec. 14, 2023

(30) Foreign Application Priority Data

Oct. 28, 2020 (SE) ................................ 2051255-4

(51) Int. Cl.
*B65D 3/28* (2006.01)
*B31B 50/62* (2017.01)
(Continued)

(52) U.S. Cl.
CPC .............. *B65D 3/28* (2013.01); *B31B 50/62* (2017.08); *B65D 3/10* (2013.01); *B31B 2105/00* (2017.08); *B31B 2110/20* (2017.08)

(58) Field of Classification Search
CPC ... B65D 3/10; B65D 3/28; B65D 3/04; B65D 3/12; B65D 3/268; B65D 3/30;
(Continued)

(56) References Cited

U.S. PATENT DOCUMENTS 1,249,095 A 12/1917 Hulbert
1,454,846 A 5/1923 Coates
(Continued)

FOREIGN PATENT DOCUMENTS

CN 86104594 A 6/1987
CN 105836310 A 8/2016
(Continued)

OTHER PUBLICATIONS

International Search Report and Written Opinion for PCT/SE2021/051010 dated Nov. 11, 2021.
(Continued)

*Primary Examiner* — Scott T McNurlen
*Assistant Examiner* — Phillip D Schmidt
(74) *Attorney, Agent, or Firm* — Womble Bond Dickinson (US) LLP

(57) ABSTRACT

The present disclosure relates to a composite paperboard container for bulk solids. The composite container comprises a rim surrounding one of the container top opening and the container bottom opening. The rim is attached with a first connecting portion of the rim to an end portion of the tubular body. The rim is a molded rim comprising pulp fiber. The rim is connected to the tubular body by at least one adhesive layer, the at least one adhesive layer comprises or consists of thermoplastic adhesive in an amount of from 0.1 mg per 10 mm of the container opening perimeter at the end portion of the tubular body. The present disclosure furthermore relates to a method of producing a composite paperboard container.

17 Claims, 9 Drawing Sheets

(51) Int. Cl.
   *B65D 3/10* (2006.01)
   *B31B 105/00* (2017.01)
   *B31B 110/20* (2017.01)

(58) Field of Classification Search
   CPC ............... B65D 43/163; B65D 43/169; B65D 2543/00268; B31B 50/62; B31B 2110/20; B31B 2105/00
   USPC .......................................................... 159/69
   See application file for complete search history.

(56) References Cited

U.S. PATENT DOCUMENTS

| | | | |
|---|---|---|---|
| 2,681,742 A | 6/1954 | Miller | |
| 3,971,489 A | 7/1976 | Welch et al. | |
| 2,118,591 A | 5/1983 | Clark | |
| 4,620,640 A | 11/1986 | Swartzbaugh | |
| 5,687,865 A | 11/1997 | Adams et al. | |
| 5,810,188 A | 9/1998 | Novakoski | |
| 6,050,441 A | 4/2000 | Kuo | |
| 10,493,735 B2 * | 12/2019 | Ding ...................... | B65D 3/12 |
| 11,697,528 B2 * | 7/2023 | Dahlin ................... | B65D 51/20 |
| | | | 220/254.1 |
| 2004/0055992 A1 | 3/2004 | Robinson et al. | |
| 2009/0230177 A1 | 9/2009 | Robertson | |
| 2009/0283526 A1 | 11/2009 | Pierce et al. | |
| 2012/0037213 A1 | 2/2012 | Cheng | |
| 2015/0251826 A1 | 9/2015 | Lee et al. | |
| 2016/0000270 A1 | 1/2016 | Wiggins et al. | |
| 2016/0177045 A1 | 6/2016 | Krist | |
| 2017/0021995 A1 | 1/2017 | Corbett | |
| 2017/0247151 A1 | 8/2017 | Chiou | |
| 2018/0016038 A1 | 1/2018 | Herlin et al. | |
| 2018/0020876 A1 | 1/2018 | Herlin et al. | |

FOREIGN PATENT DOCUMENTS

| | | | | | |
|---|---|---|---|---|---|
| CN | 105857880 | A | | 8/2016 | |
| CN | 106061856 | A | | 10/2016 | |
| CN | 107000856 | A | | 8/2017 | |
| CN | 107406172 | A | | 11/2017 | |
| CN | 108163351 | A | * | 6/2018 | ......... B65D 43/0202 |
| CN | 109415149 | A | * | 3/2019 | ............... B31D 1/00 |
| DE | 86 04 128 | U1 | | 3/1986 | |
| DE | 20 2005 009 426 | U1 | | 8/2005 | |
| EP | 2 399 840 | A1 | | 12/2011 | |
| EP | 2 527 265 | A1 | | 11/2012 | |
| EP | 4011798 | A1 | * | 6/2022 | ............. A47K 10/20 |
| JP | 3153084 | U | | 8/2009 | |
| JP | 6770787 | | | 10/2020 | |
| KR | 20-0385831 | Y1 | | 6/2005 | |
| SE | 1851334 | A1 | | 4/2020 | |
| TW | 201425157 | A | | 7/2014 | |
| WO | WO 02/34824 | A2 | | 5/2002 | |
| WO | WO 2016/126191 | A1 | | 8/2016 | |
| WO | WO 2016/126193 | A1 | | 8/2016 | |
| WO | WO-2016126190 | A1 | * | 8/2016 | ............. B65D 15/04 |
| WO | WO-2016126194 | A1 | * | 8/2016 | ............. B65D 15/08 |
| WO | WO 2016/195616 | A1 | | 12/2016 | |
| WO | WO 2017/089508 | A1 | | 6/2017 | |
| WO | WO 2017/180056 | A1 | | 10/2017 | |
| WO | WO 2017/204731 | A1 | | 11/2017 | |
| WO | WO 2019/156617 | A1 | | 8/2019 | |
| WO | WO 2020/016409 | A1 | | 1/2020 | |
| WO | WO-2020085992 | A1 | * | 4/2020 | ............. B65D 15/08 |

OTHER PUBLICATIONS

Supplementary European Search Report for European Application No. 21 88 7037 dated Sep. 25, 2024.

\* cited by examiner

COMPOSITE PAPERBOARD CONTAINER WITH A RIM COMPRISING FIBERS, AND A METHOD FOR PRODUCING SUCH A CONTAINER

CROSS-REFERENCE TO RELATED APPLICATIONS

The present application is a national stage entry under 35 U.S.C. § 371 of International Patent Application No. PCT/SE2021/051010, filed on Oct. 14, 2021, which claims the benefit of Swedish Patent Application No. 2051255-4, filed on Oct. 28, 2020.

TECHNICAL FIELD

The present disclosure relates to a composite paperboard container and a method of producing the composite paperboard container.

BACKGROUND OF THE INVENTION

In the area of disposable containers for products such as infant formula, tobacco, detergents, etc. there is an ongoing need of diminishing the carbon footprint of such products, by minimizing the resource use for the disposable containers as well as making the containers recyclable. The disposable containers referred to herein are composite containers having a tubular body which is made from a laminate sheet material comprising a carton layer, i.e., a layer made predominantly from cellulosic fibres. For certain containers, the upper and lower end edge of the container include a plastic rim connected to the edges of the packaging container. This provides the packaging containers with a pleasant and neat appearance and the container top or bottom may also be more wear resistant. To provide a container free from plastic components, the top and/or bottom portions of the container may alternatively be made from a folded-in end portion of the tubular body. The appearance may however for such packaging containers be somewhat less attractive and less wear resistant at the bottom end of the packaging container.

Paperbased materials have traditionally been considered less suitable for use in making covers and rims for paperboard containers as they have been considered to have low shape stability and to be less resistant to damage and wear than plastic components. It has also been difficult to attain secure and tight attachment to the paperboard container body of such components as well as a tight closure between a rim and a container lid.

There is consequently a need to provide further packaging for sensitive goods such as food products with improved recyclability, without sacrificing durability or packaging safety for the packaged goods.

SUMMARY OF THE INVENTION

The above object may be achieved with a composite paperboard container according to claim 1, by a method of producing a composite paperboard container according to claim 12. Further advantages and advantageous features of the invention are disclosed in the following description and in the dependent claims According to a first aspect, the present disclosure relates to a composite paperboard container for bulk solids. The composite paperboard container comprises a tubular body being closed at a bottom end over a container bottom opening opposite a container top opening at a top end of the tubular body. The tubular body has an inner surface facing towards an interior of the tubular body and an outer surface facing away from the interior of the tubular body. The tubular body extends in a longitudinal direction between the bottom end and the top end of the tubular body. The composite container comprises a rim surrounding the container top opening and/or the bottom opening, the container top opening having a top opening perimeter and the container bottom opening having a bottom opening perimeter. The rim is attached with a first connecting portion of the rim to an end portion of the tubular body along an end edge of the tubular body. The tubular body is made from a laminate sheet material comprising a carton substrate layer. The rim is a molded rim comprising pulp fibers, such as softwood pulp fibers. The rim is connected to the tubular body by means of a first adhesive layer, the first adhesive layer comprises a thermoplastic adhesive and is arranged in a first gap between the first connecting portion of the rim and the end portion of the tubular body. The first adhesive layer comprises or consists of thermoplastic adhesive in an amount of from 0.1 mg per mm of the container opening perimeter at the end portion of the tubular body.

The first adhesive layer may layer comprise or consists of thermoplastic adhesive in an amount within the range of from 0.1 mg to 10 mg per mm of the container opening perimeter at the end portion of the tubular body. Preferably the first adhesive layer comprises or consists of thermoplastic adhesive in an amount within the range of from 0.5 mg to 5 mg per mm of the container opening perimeter at the end portion of the tubular body. The first adhesive layer may comprise or consist of thermoplastic adhesive in an amount of within the range of from 1 mg to 5 mg per mm of the container opening perimeter at the end portion of the tubular body.

The rim is a molded rim comprising pulp fibers, the molded rim may be constituted of from 95% to 100% of pulp fibers, such as softwood pulp fibers, optionally of from 98% to 100% of pulp fibers. Examples of such materials which have been developed for molding applications such as molded trays and blisters, shaped or embossed boxes, etc. are produced e.g., at Billerud Gruvön and sold as Billerud FibreForm®. A similar material is the Advantage Formable paper available from Mondi.

There is desire to provide packaging for sensitive goods such as food products with improved recyclability, without sacrificing durability or packaging safety for the packaged goods. However, since the rim is a molded rim comprising pulp fibers the structure may be less flexible and may also have a more irregular surface compared to a conventional plastic rim which may reduce the adhesion between the rim and the tubular paperboard body and thus the rigidity of the container. Thereby, durability or packaging safety for packaged goods may be reduced since there could be a risk of smaller insects, such as Pharaoh ants, penetrating the space between the tubular body and the rim. It was however surprisingly found by the present inventor, that by increasing the amount of thermoplastic adhesive to an amount of from 0.1 mg per mm of the container opening perimeter around which the rim is attached a satisfying sealing tightness allowing packaging for sensitive goods such as food products could be achieved.

The end portion of the tubular body may either be at the container top opening or at the container bottom opening.

The rim may be connected either to the inner surface or to the outer surface of the tubular body via the first connecting portion. The first connecting portion is a circumferential connecting portion extending around the entire circumference of the tubular body. The first connecting portion is connected to the tubular body along the entire end portion of the tubular body. To provide enhanced attachment and sealing between the rim and the tubular body, the tubular body may be provided with a thermoplastic layer, such as a polyethylene or polypropylene layer, on the surface facing the first connecting portion, such as on the inner surface and/or on the outer surface of the tubular body. Alternatively, or additionally, the rim may be provided with a thermoplastic layer on a surface facing the tubular body. A thermoplastic layer provides the rim with a less irregular surface and, thus, enhances the sealing and improves the durability or packaging safety for the packaged goods.

The first connecting portion, being a first circumferential portion of the rim, may have a first distal edge and the first distal edge of the first connecting portion may be located at a distance from the end edge of the tubular body, the distance being from 4 mm, optionally within the range of from 4 mm to 50 mm, preferably within the range of from 5 mm to 40 mm. The first connecting portion of the rim may be a longitudinally extending circumferential collar facing the inner or outer surface of the tubular body. Since the rim is a molded rim comprising pulp fibers the structure may be less flexible and stable compared to a conventional plastic rim. It has been found that a rim having a first connecting portion located at a distance from the end edge of from 4 mm, optionally of from 4 mm to 50 mm provides an enhanced shape stability for the rim by means of the tubular body wall providing a support for the most fragile part of the rim, namely the connecting portion or connecting portions.

A circumferential area of the tubular body facing the first connecting portion of the rim extending from the end edge of the tubular body to at least 4 mm, optionally at least 10 mm, towards the opposite end edge of the tubular body as seen in the longitudinal direction, may be covered with the first adhesive layer. This may provide structural support to the first connecting portion of the rim.

The first connecting portion may face the inner surface of the tubular body and the rim may comprise a second connecting portion facing the outer surface of the tubular body. The rim may furthermore be connected to the tubular body by means of a second adhesive layer applied on the outer surface of the tubular body, the second adhesive layer comprising or consisting of a thermoplastic adhesive and being arranged in a second gap between the second connecting portion of the rim and the end portion on the outer surface of the tubular body. Since an adhesive layer is provided both in the first gap between the first connecting portion and the inner surface and in the second gap between the second connecting portion and the tubular body, an improved sealing and an enhanced stability of the rim and tubular body connection may be achieved.

The second adhesive layer may be arranged in the second gap in an amount of from 0.1 mg per mm of the container opening perimeter at the end portion of the tubular body.

The second adhesive layer may layer comprise or consists of thermoplastic adhesive in an amount within the range of from 0.1 mg to 10 mg per mm of the container opening perimeter at the end portion of the tubular body. Preferably the second adhesive layer comprises or consists of thermoplastic adhesive in an amount within the range of from 0.5 mg to 5 mg per mm of the container opening perimeter at the end portion of the tubular body. The second adhesive layer may comprise or consist of thermoplastic adhesive in an amount of within the range of from 1 mg to 5 mg per mm of the container opening perimeter at the end portion of the tubular body.

The second connecting portion of the rim may have a first distal edge and the first distal edge of the connecting portion may be located at a distance from the end edge of the tubular body, the distance being within the range of from 4 mm to 50 mm, optionally within the range of from 5 mm to 40 mm.

The rim may surround the container top opening and be a part of a lid component, the lid component comprising a rim part and a lid part, the rim part and the lid part being molded in one piece with one or more hinge portions connecting the rim part and the lid part.

The rim may be an inner rim and the packaging container may additionally comprise a lid component including an outer rim part and a lid part. The outer rim component may comprise fibres and may be moulded in one piece with the outer rim part being connected to the lid part via a hinge portion and the outer rim component may be connectable to the inner rim.

The composite paperboard container may be free from plastic components, such as a plastic rim component, lid component or bottom component. With plastic components is intended separate components and not layers in a paperboard laminate material. Such composite container may be recycled without separating plastic components from the paperboard container body.

The rim may have a density within the range of from 0.2 to 1.5 kg/dm$^3$, optionally within the range of from 0.2 to 1 kg/dm$^3$, optionally within the range of from 0.4 to 0.8 kg/dm$^3$. The rim according to the present disclosure is a molded rim and therefore needs to have a structural durability, preferably a structural durability similar to a plastic rim. For rim components which are to be connected to an additional rim part, such as an inner rim component and an outer rim component, the rim components need to have a certain flexibility and to be able to be structurally stable.

The rim may comprise a U-shaped or a square edge U-shaped track portion comprising a first and a second side wall section and a bottom section facing the end edge of the tubular body and connecting the first and the second side wall sections. The first side wall section may correspond to the first connecting portion, or the first connecting portion may comprise the first side wall portion. A draft angle between the bottom section and the first side wall section, may be within the range of from zero to ten degrees, optionally within the range of from zero to five degrees, this promotes a tight fitting between the rim and the tubular body end portion along the entire first side wall section.

A distance between the first side wall section and the second side wall section may vary less than 3 mm along the entire first and second side wall sections. This promotes a tight fitting between the rim track portion and the tubular body end portion, stabilizing the rim and tubular body at the end portion and improving the durability of the packaged goods and the packaging safety.

The rim may comprise an L-shaped connecting portion comprising a first side wall section and a bottom section facing the end edge of the tubular body. The first side wall section may correspond to the first connecting portion, or the first connecting portion may comprise the first side wall portion. A draft angle, between the bottom section and the first side wall section, may be within the range of from zero to ten degrees, optionally within the range of from zero to five degrees. This promotes a tight fitting between the L-shaped connecting portion and the tubular body end portion improving the durability of the packaged goods and the packaging safety The distance between the bottom section and the connecting portion distal edge may be from 3 mm, optionally within the range of from 7 mm to 30 mm. Such connecting portion promotes an improved structural stability and a prolonged storage stability.

The first connecting portion may be provided with distance elements, such as ribs extending in the longitudinal direction of the tubular body, the distance elements facing the tubular body, such as for example the inner surface of the tubular body. The first connecting portion may be provided with three or more distance elements, such as five or more or ten or more distance elements, arranged in parallel as seen in a circumferential direction of the tubular body. The distance elements provide channels for the adhesive and a distance to the tubular body upon application of the rim to the end portion of the tubular body, thereby preventing that the adhesive is scraped off the first connecting portion/tubular body end portion upon application of the rim and thereby promoting a uniform spread of the adhesive. A draft angle of the first connecting portion is in such case measured at a location between the distance elements.

The first connecting portion may comprise a first side wall section and a guiding side wall section, the guiding side wall section extending from the first side wall section. The guiding side wall section is a section having a greater distance to the tubular body than the first side wall section. The guiding side wall section may be an inclined wall section with an increasing distance to the tubular body as seen from the end edge of the tubular body and in a longitudinal direction of the tubular body.

For a rim having a L-shaped, U shaped or square U-shaped cross section, the guiding side wall section may be an inclined wall section with an increasing distance to the tubular body as seen from the end edge of the tubular body and in a longitudinal direction of the tubular body. The guiding wall section may have a draft angle of from two to thirty degrees. The draft angle of the guiding wall section may be greater than a draft angle of the first side wall section.

In step d) the first connecting portion may be provided with distance elements, such as ribs extending in the longitudinal direction of the tubular body, the distance elements facing the tubular body, such as for example the inner surface of the tubular body.

Since the rim is made from pulp fibers, the structure may be more fragile and less flexible than a plastic rim and additionally give rise to a greater friction between the rim and the tubular paperboard body. To reduce the risk of damaging either the rim or the edge portion when applying adhesive to the first connecting portion, the rim may comprise a guiding side wall section extending from the first side wall section. Additionally, this promotes correct application of the adhesive to the first connecting portion since the access for the nozzle applying the adhesive is enhanced. This is also an advantage when attaching the rim to the tubular body. This may in particular be advantageous when the rim comprises a U-shaped or a square edge U-shaped track portion in which the end portion of the tubular body is inserted. Due to the fact that the rim comprises pulp fibers, an increased amount of adhesive needs to be applied between the rim and the tubular body to ensure complete filling of adhesive in the gap between the rim and the side walls of the track. The guiding portion may additionally serve as a reservoir for adhesive being pressed out from the gap thereby protecting the interior of the container or the outer surface from being soiled by the adhesive.

According to a second aspect, the present disclosure relates to a method of producing a composite paperboard container for bulk solids according to any one of the preceding claims, the method comprising the steps of;
  a) bending a paperboard laminate sheet material comprising a carton substrate layer and a thermoplastic welding layer into a tube, the tube having a longitudinal direction, a radial direction perpendicular to the longitudinal direction, closing the tube in the longitudinal direction by joining overlapping or abutting side edges of the paperboard material thereby forming a tubular body, the tubular body having an inner surface facing towards an interior of the tubular body and an outer surface facing away from the interior of the tubular body;
  b) imparting a predetermined cross-sectional shape to said tube;
  c) closing the tubular body at a bottom end over a container bottom opening opposite a container top opening at a top end of the tubular body;
  d) providing pulp fibers, such as softwood fibers, into a molding tool thereby forming a three-dimensionally shaped rim component comprising fibers, the fibers being pulp fiber, the rim comprising a connecting portion having a distal edge;
  e) providing a first adhesive layer, comprising a thermoplastic adhesive, to the first connecting portion of the rim and/or to an end portion of the tubular body along an end edge of the tubular body, in an amount of from 0.1 mg per mm of the container opening perimeter at the end portion; and
  f) providing the rim to the end portion, thereby adhesively attaching the rim to the tubular body.

Step d) of forming a rim may comprise forming the rim having a second connecting portion and wherein step f) may include that the first adhesive layer is provided on the end portion on the inner surface of the tubular body and furthermore providing a second adhesive layer, comprising a thermoplastic adhesive, on the end portion on the outer surface of the tubular body.

In step d) the second adhesive layer may be arranged in the second gap in an amount of from 0.1 mg per mm of the container opening perimeter at the end portion of the tubular body.

It is furthermore to be understood that step e) and f) may be performed in combination, such that the rim is attached to the end portion and that a first adhesive layer comprising a thermoplastic adhesive is injected in a gap between an end portion of the tubular body and the first connecting portion of the rim in an amount of from 0.1 mg per mm of the container opening perimeter at the end portion.

The rim may have a density within the range of from 0.2 to 1.5 kg/dm$^3$, optionally within the range of from 0.2 to 1 kg/dm$^3$, optionally within the range of from 0.4 to 0.8 kg/dm$^3$.

The rim formed in step d) may comprise a U-shaped or a square edge U-shaped track portion comprising a first and a second side wall section and a bottom section facing the end edge of the tubular body, and wherein step e) may include arranging the rim such that the bottom section faces the end edge of the tubular body.

A draft angle, between the bottom section and the first side wall section, may be within the range of from zero to ten degrees, such as zero to five degrees.

A distance between the first side wall section and the second side wall section may vary less than 3 mm along the entire first and second side wall sections.

The rim formed in step d) may comprise an L-shaped connecting portion comprising a first side wall section and a bottom section facing the end edge of the tubular body, and wherein a draft angle, between the bottom section and the first side wall section, may be within the range of from zero to ten degrees, such as within the range of from zero to ten degrees, optionally within the range of from zero to five degrees.

For the rim formed in step d) the first connecting portion may comprise a guiding side wall section extending from a first wall section of the first connecting portion, the guiding side wall section having a greater distance to the tubular body than the first wall section upon application of the rim.

The guiding side wall section may be an inclined wall section with an increasing distance to the tubular body as seen from the end edge of the tubular body and in a longitudinal direction of the tubular body. The guiding wall section may have a draft angle, as seen from the bottom section of from two to thirty degrees. The draft angle of the guiding wall section may be greater than a draft angle of the first side wall section.

In step d) the first connecting portion may be provided with distance elements, such as ribs extending in the longitudinal direction of the tubular body, the distance elements face the tubular body, such as for example the inner surface of the tubular body. The distance elements provide channels for the adhesive and a distance to the tubular body upon application of the rim to the end portion of the tubular body, thereby preventing that the adhesive is scraped of the first connecting portion/tubular body end portion upon application of the rim and thereby promoting a uniform spread of the adhesive.

The cross-sectional shape of the tubular body may be a modified rectangular shape with rounded corners. It is to be understood that the tubular body may have any useful cross-sectional shape such as circular shape, oval shape, or any polygonal or modified polygonal shape such as triangular shape, square shape, pentagonal shape, etc.

BRIEF DESCRIPTION OF THE DRAWINGS

The present invention will be further explained hereinafter by means of non-limiting examples and with reference to the appended drawings wherein.

DETAILED DESCRIPTION

It is to be understood that the drawings are schematic and that individual components, such as layers of materials and container components are not necessarily drawn to scale.

The composite paperboard container and the steps in the method of forming a composite paperboard container shown in the figures are provided as examples only and should not be considered limiting to the invention. Accordingly, the scope of the invention is determined solely by the scope of the appended claims.

Figure 1:
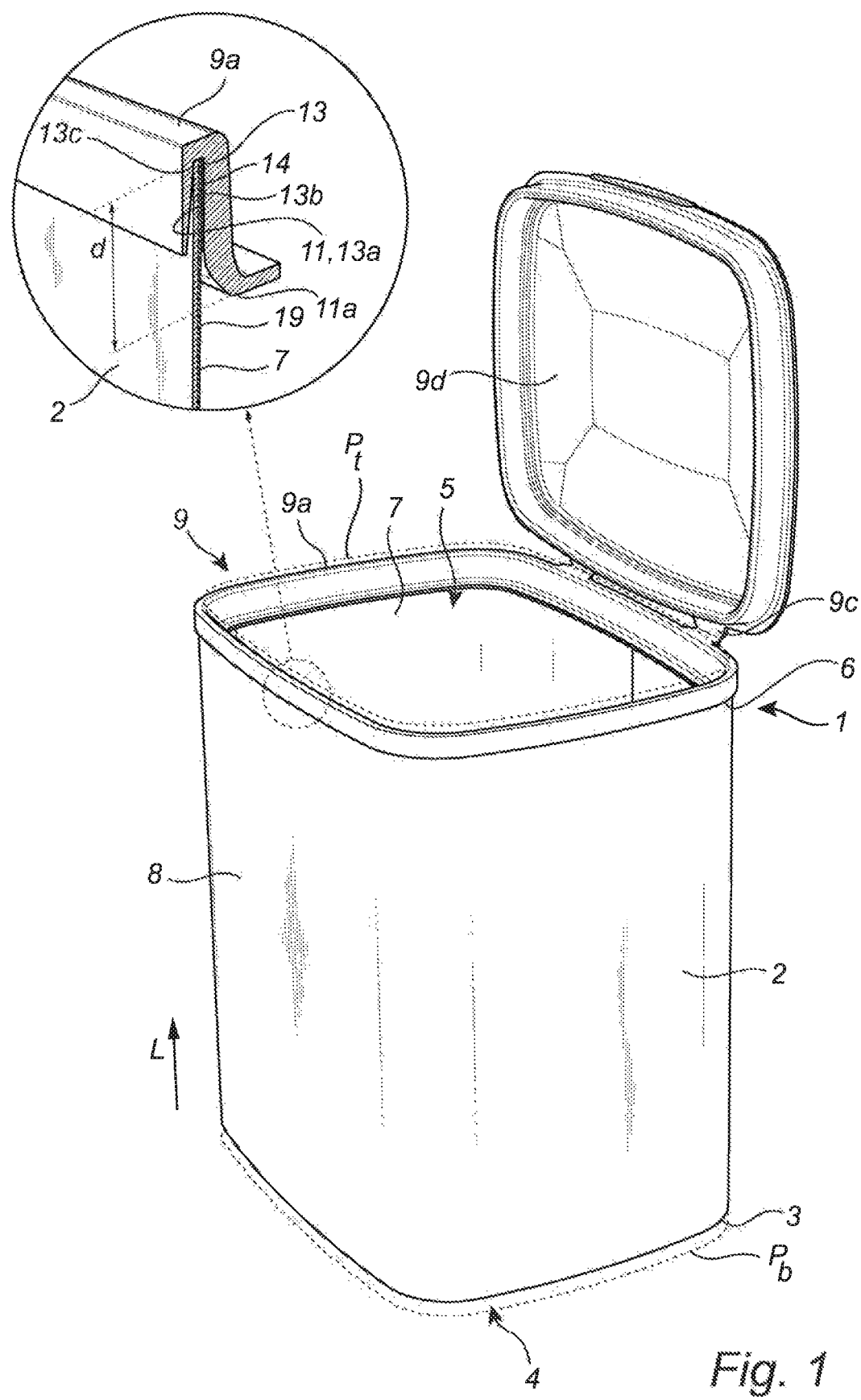
FIG. 1 illustrates a composite paperboard container according to the present invention.

FIG. 1 illustrates a composite paperboard container 1 for bulk solids, the composite paperboard container 1 comprising a tubular body 2 being closed at a bottom end 3 over a container bottom opening 4 opposite a container top opening 5 at a top end 6 of the tubular body 2. The tubular body 2 has an inner surface 7 facing towards an interior of the tubular body 2 and an outer surface 8 facing away from the interior of the tubular body 2. The tubular body 2 extends in a longitudinal direction L between the bottom end 3 and the top end 6. The tubular body is made from a laminate sheet material comprising a carton substrate layer and a thermoplastic layer 14 on the inner surface 7. The composite container 1 comprises a rim 9 surrounding the container top opening 5. The rim 9 is a molded rim 9 as disclosed herein comprising pulp fiber, such as softwood pulp fibers. The rim 9 is a rim and lid component 9 and comprises a rim part 9*a* and a lid part 9*b*. The rim part 9*a* and the lid part 9*b* are moulded in one piece. The rim part 9*a* is connected to the lid part 9*b* via two hinge portions 9*c*. The rim 9 is connected to the tubular body 2 by means of a first adhesive layer 14 arranged in a first gap between the first connecting portion 11 of the rim 9 and the end portion 10 of the tubular body 2. The first connecting portion 11 faces the inner surface 7 and of the tubular body 2.

The container top opening 5 has a top opening perimeter $p_t$ and the container bottom opening 4 has a bottom opening perimeter $p_b$. The rim part 9*a* of the rim 9 is attached with a first connecting portion 11 of the rim part 9*a* to an end portion 10 of the tubular body 2 along an end edge 12 of the tubular body 2, the tubular body 2 being made from a laminate sheet material comprising a carton substrate layer and a thermoplastic layer 19 provided on the inner surface 7.

The first adhesive layer 14 comprises or consists of thermoplastic adhesive in an amount of from 0.1 mg per mm of the container opening perimeter $p_t$, at the end portion 10 at the top end 6 of the tubular body 2. If the rim is a bottom rim, the first adhesive layer comprises or consists of thermoplastic adhesive in an amount of from 0.1 mg per mm of the container opening perimeter $p_b$, at the end portion 10 at the bottom end 3 of the tubular body 2. In the composite packaging container 1 in FIG. 1, the container top opening perimeter p t and the container bottom opening perimeter $p_b$ are the same.

The composite paperboard container 1 is free from plastic components, such as a plastic rim component, lid component or bottom component.

The rim part 9*a* comprises a square edge U-shaped track portion 13, as seen in a cross-section view, comprising a first and a second side wall section 13*a*, 13*b* and a bottom section 13*c* facing the end edge 12 of the tubular body 2. The connecting portion 11 of the rim part 9*a* comprising the first side wall section 13*a*.

Figure 2:
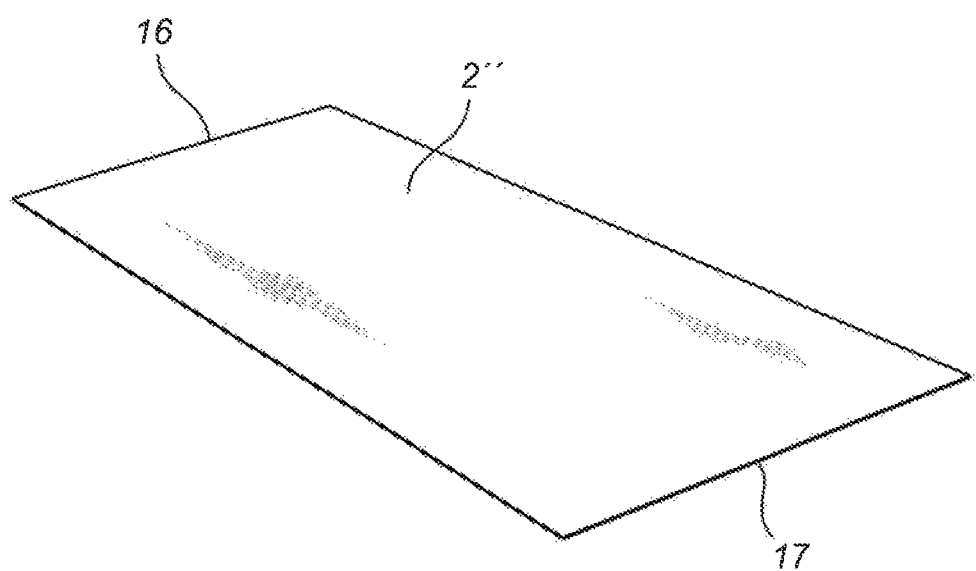
FIG. 2 illustrates a paperboard blank.
Figure 3:
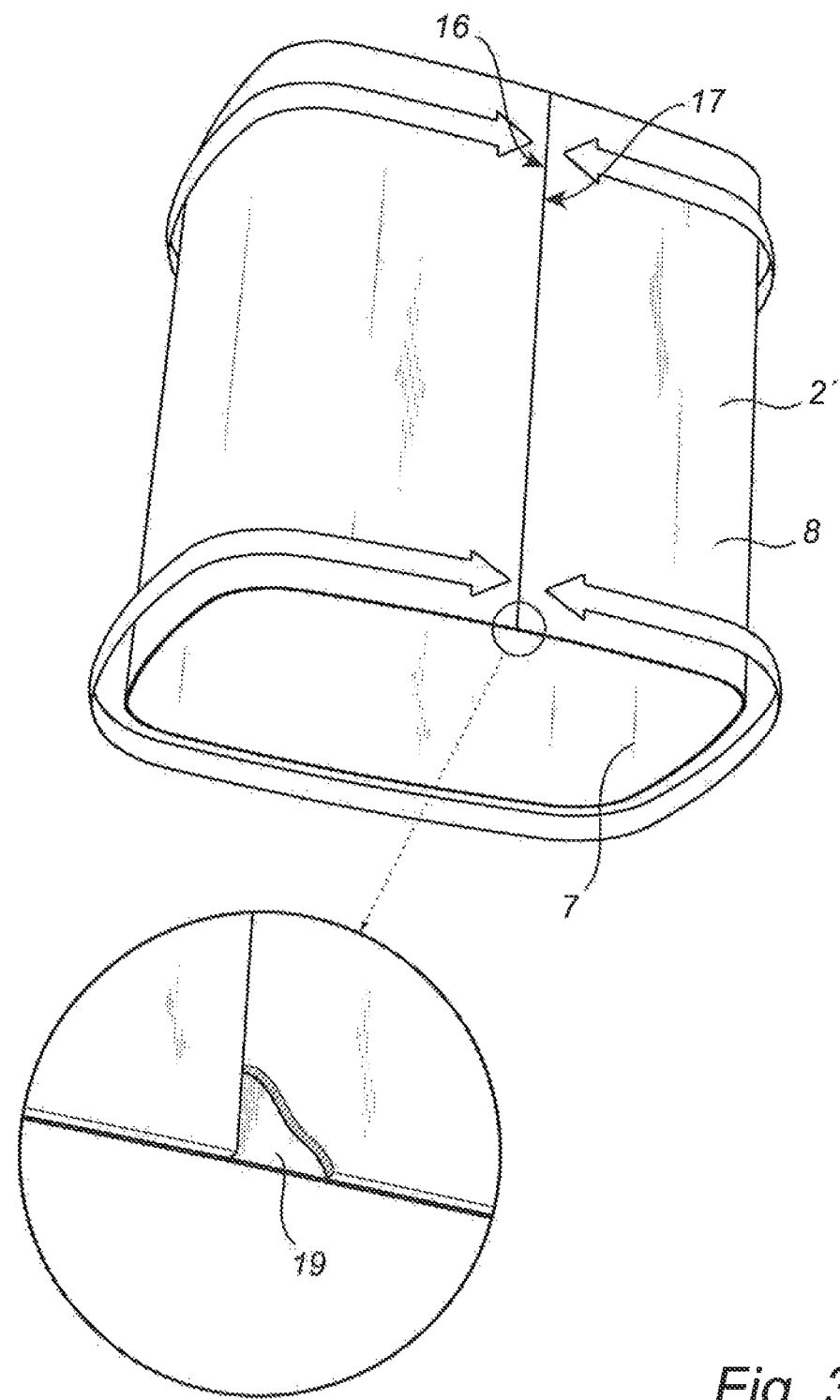
FIG. 3 illustrates folding of the paperboard blank to a tubular body.

FIGS. 2 to 9 show a method of producing a composite paperboard container 1 for bulk solids. FIG. 2 illustrates a paperboard laminate sheet material 2" comprising a carton substrate layer. The laminate sheet material 2" has opposing side edge 16, 17. FIG. 3 shows a first step a) of bending the paperboard laminate sheet material 2" into a tube 2', the tube 2' having a longitudinal direction L, and closing the tube 2' in the longitudinal direction L by joining abutting side edges 16, 17 of the paperboard material 2" thereby forming a tubular body 2. The join between the side edges may be covered by a sealing strip. The side edges 16, 17 may alternatively be joined being overlapping side edges. The tubular body 2 formed has an inner surface 7 facing towards an interior of the tubular body 2 and an outer surface 8 facing away from the interior of the tubular body 2. The inner surface 7 is provided with a thermoplastic layer 19. The tube is shaped to have a predetermined cross-section. In the example shown in the figures, the cross-sectional shape is a modified rectangular shape with rounded corners. It is to be understood that the tubular body may have any useful cross-sectional shape such as circular shape, oval shape, or any polygonal or modified polygonal shape such as triangular shape, square shape, pentagonal shape, etc.

Figure 4:
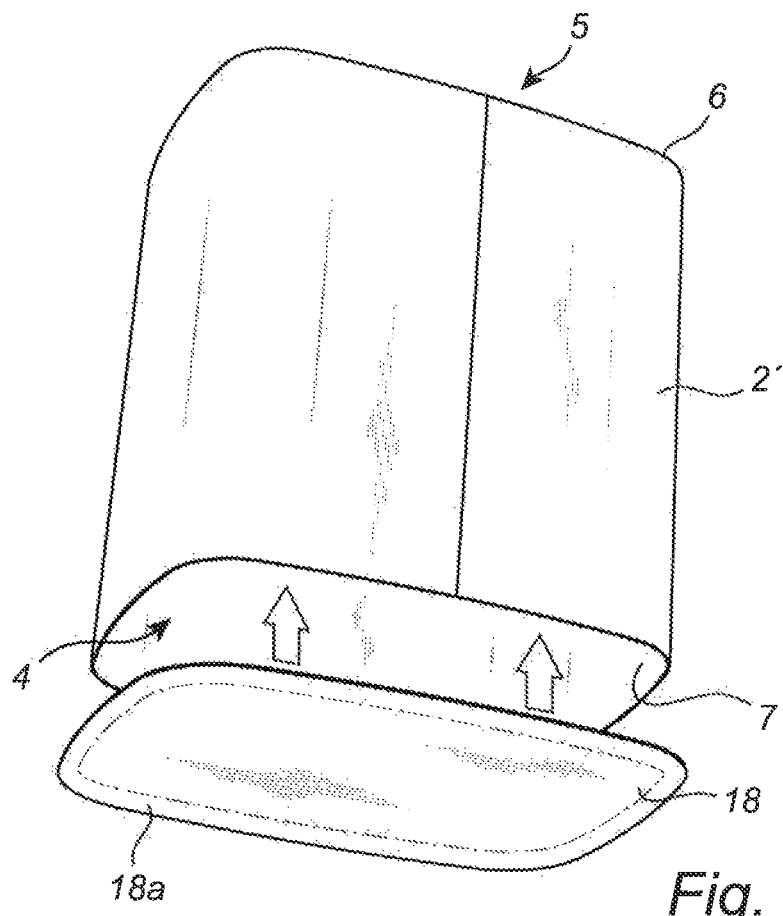
FIG. 4-5 illustrates inserting a paperboard disc into the tubular body thereby forming a container bottom.
Figure 5:
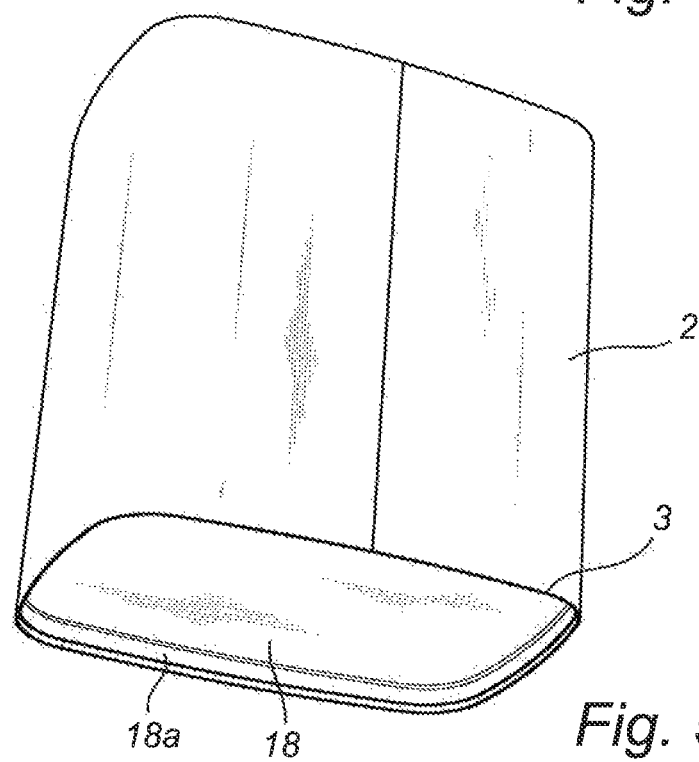

FIGS. 4 and 5 illustrate a step c) of closing the tubular body 2 at a bottom end 3 over a container bottom opening 4 opposite a container top opening 5 at a top end 6 of the tubular body 2. The bottom opening 4 is closed by pressing a paperboard bottom disc 18 into the tube at the bottom end 3. The bottom disc 18 has a peripheral flange 18a being flexed towards the bottom end 3 in the longitudinal direction L. The flexed peripheral flange 18a may be attached to the inner surface 7 of the tubular body 2 for example by welding. The paperboard bottom disc 18 may constitute of a laminate sheet material comprising a carton substrate layer and a thermoplastic welding layer, alternatively or additionally the tubular body 2 may be provided with a thermoplastic welding layer on the inner surface 7. A thermoplastic welding layer may include metallic powder, may be a metallised thermoplastic layer, or the laminate sheet material may contain a metallic foil such as an aluminium foil.

Figure 6:
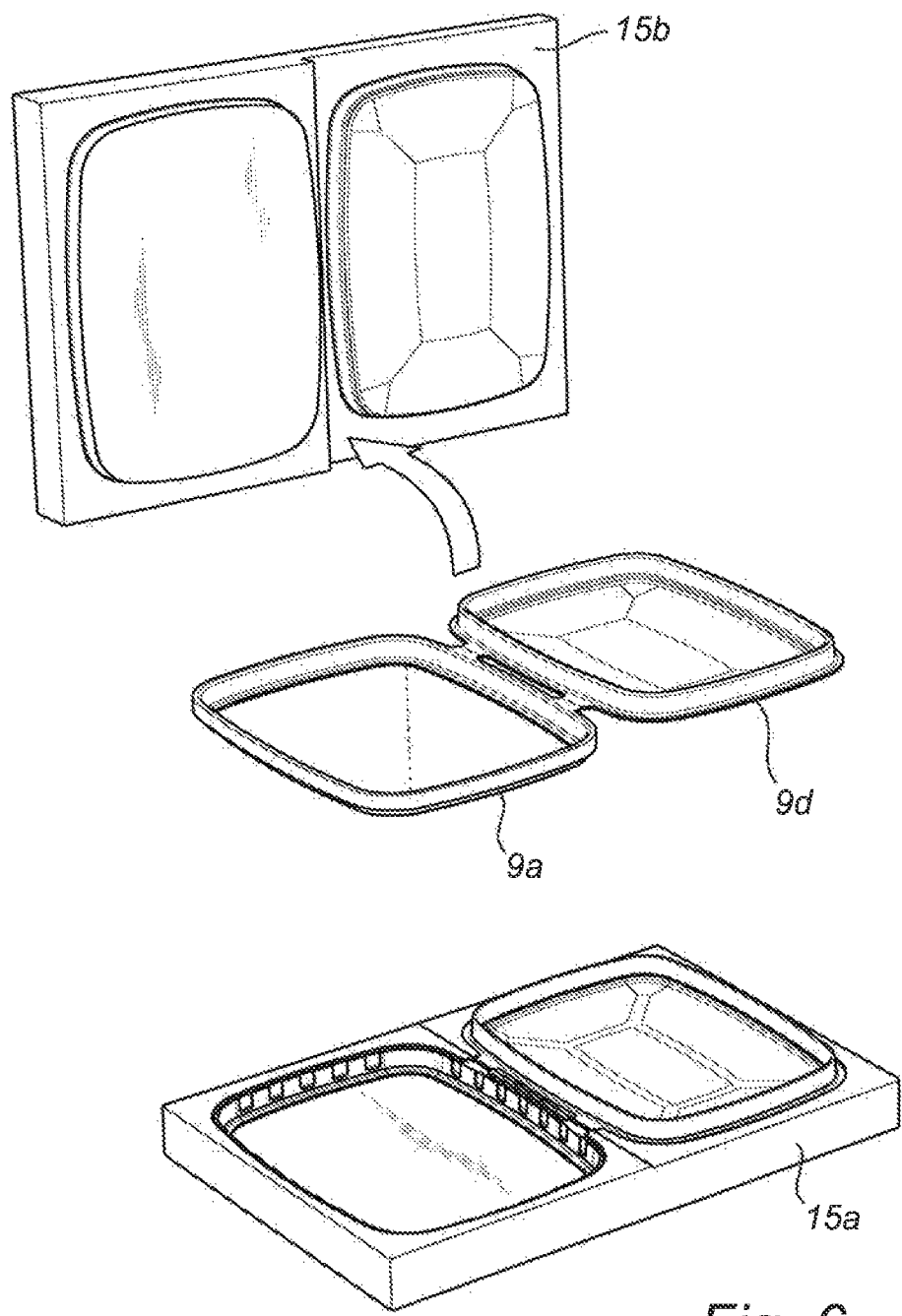
FIG. 6 illustrates molding of pulp fibers to form a rim and lid component.

FIG. 6 illustrates a step of forming the molded rim 9. The molded rim is formed by providing softwood pulp fibers, such as in the form of a pulp slurry, in a molding tool 15. The molding tool 15 comprises a female molding tool component 15a and a mating male molding tool component 15b between which the pulp fibers are pressed between the female molding tool component 15a and the male molding tool component 15b to form a three-dimensionally shaped rim component 9 comprising pulp fibers.

Figure 7A:
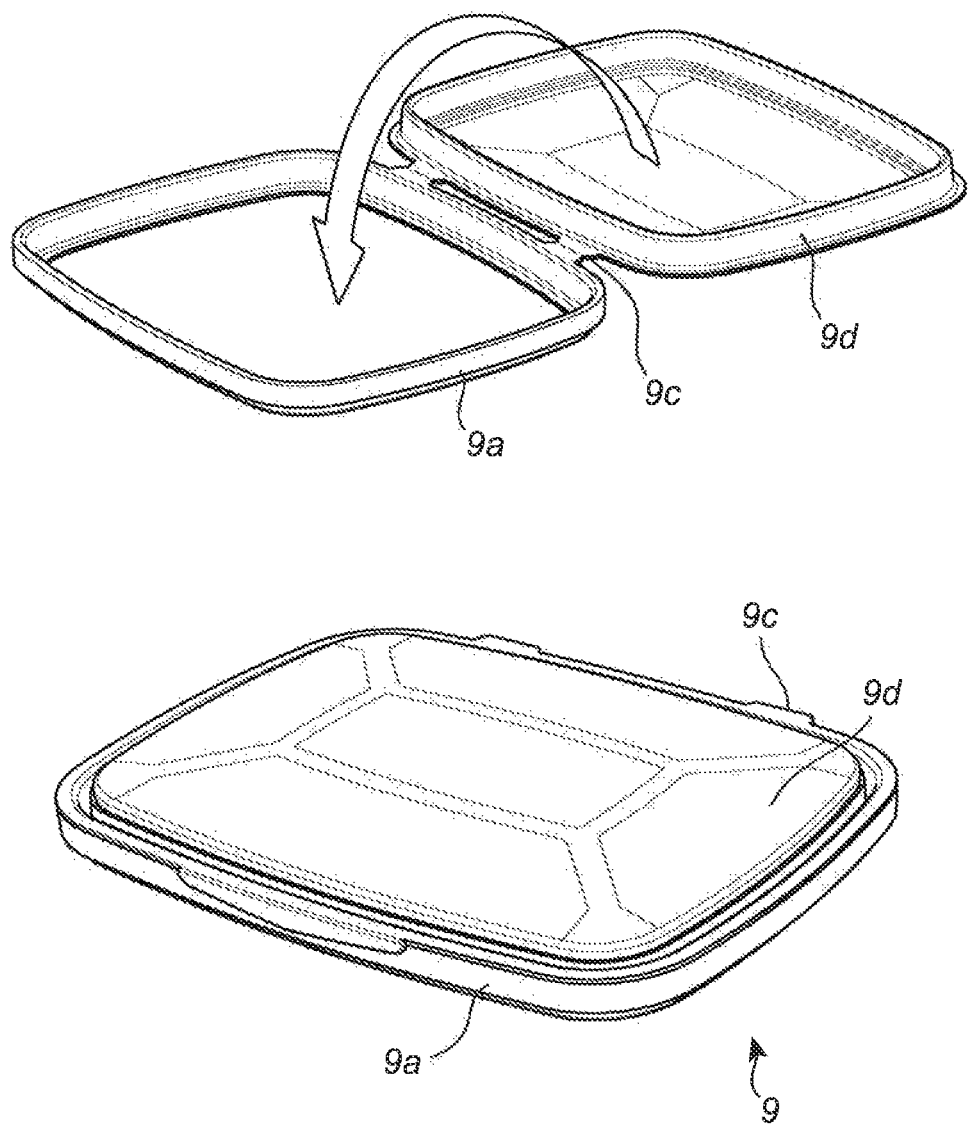
FIG. 7*a*-7*c* illustrate the molded rim and lid component.
Figure 7B:
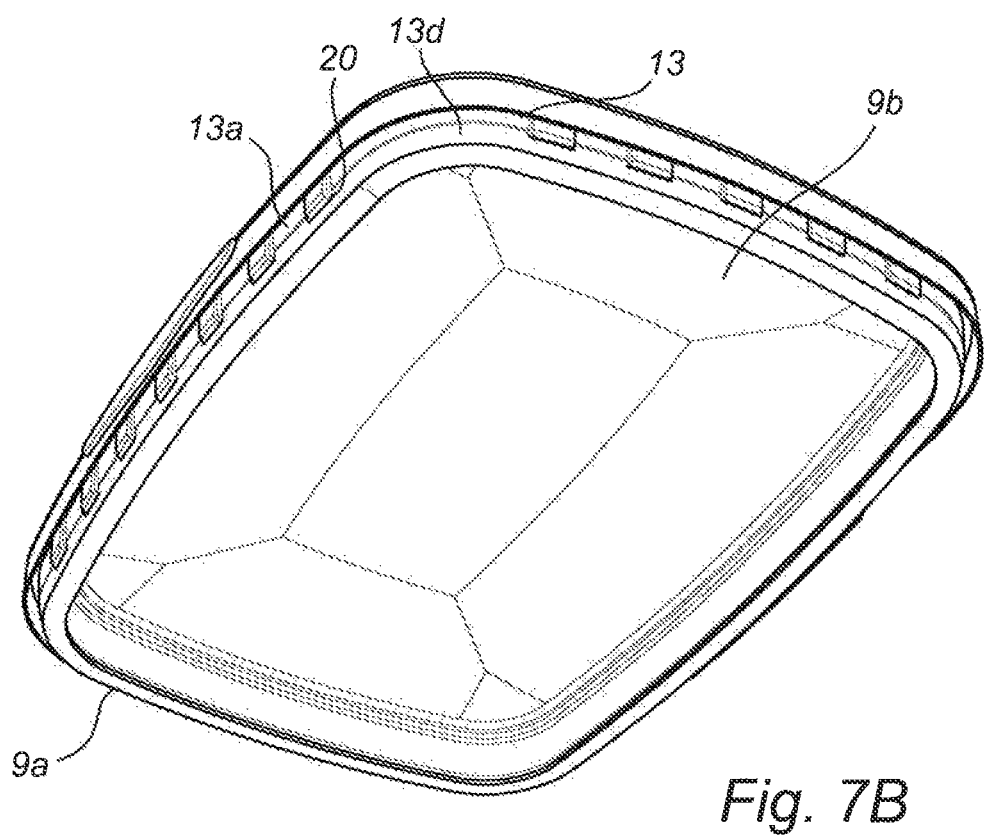
Figure 7C:
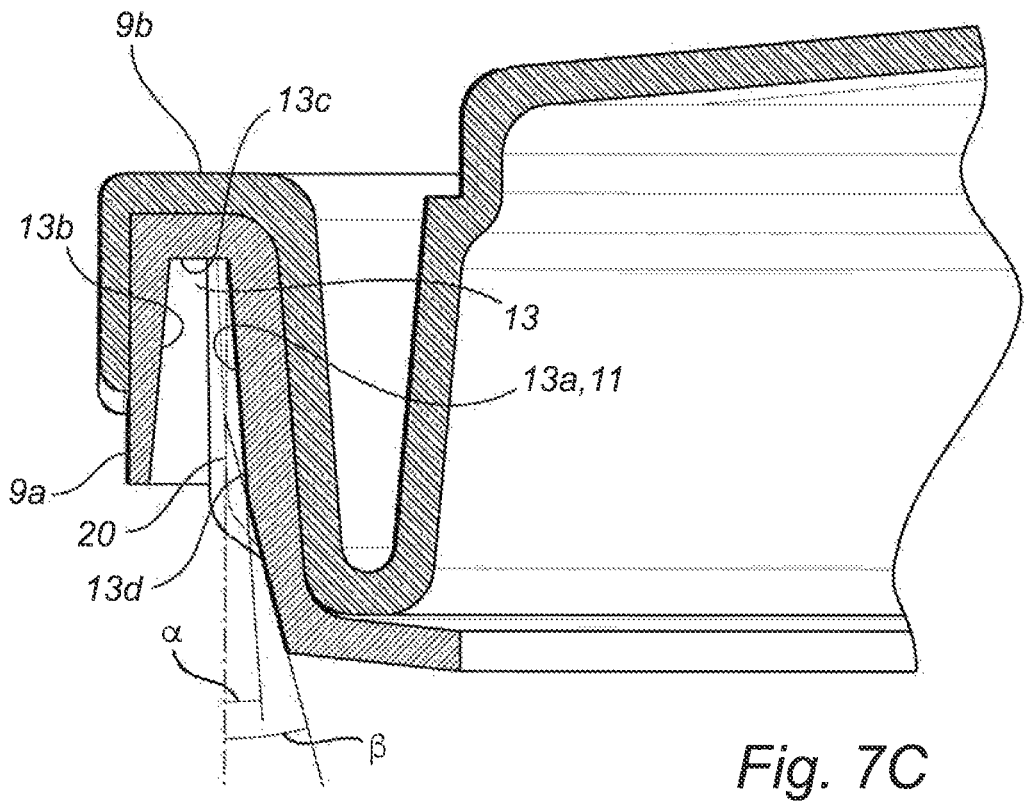

FIGS. 7a-7c illustrate the rim and lid component including a rim part 9a and a lid part 9b molded in one piece and being connected to each other via two hinge portions 9c. The rim part 9a has a square edge U-shaped track portion 13, as seen in a cross-sectional view, comprising opposing first and a second side wall sections 13a, 13b and a bottom section 13c intended to face the end edge 12 of the tubular body 2. The first connecting portion 11 of the rim part 9a comprises the first side wall section 13a and a guiding side wall section 13d extending in a longitudinal direction of the tubular body when the rim part 9a is applied to the end edge of the tubular body. A draft angle α, between the bottom section 13c and the first side wall section 13a, is within the range of from zero to ten degrees and a draft angle β, between the bottom section 13c and the guiding wall section 13d, is within the range of from two to thirty degrees. The draft angle of the guiding wall section 13d is greater than a draft angle of the first side wall section 13a.

The first side wall section 13a is provided with distance elements 20, such as ribs extending in the longitudinal direction L of the tubular body when the rim is applied to the tubular body.

Figure 8:
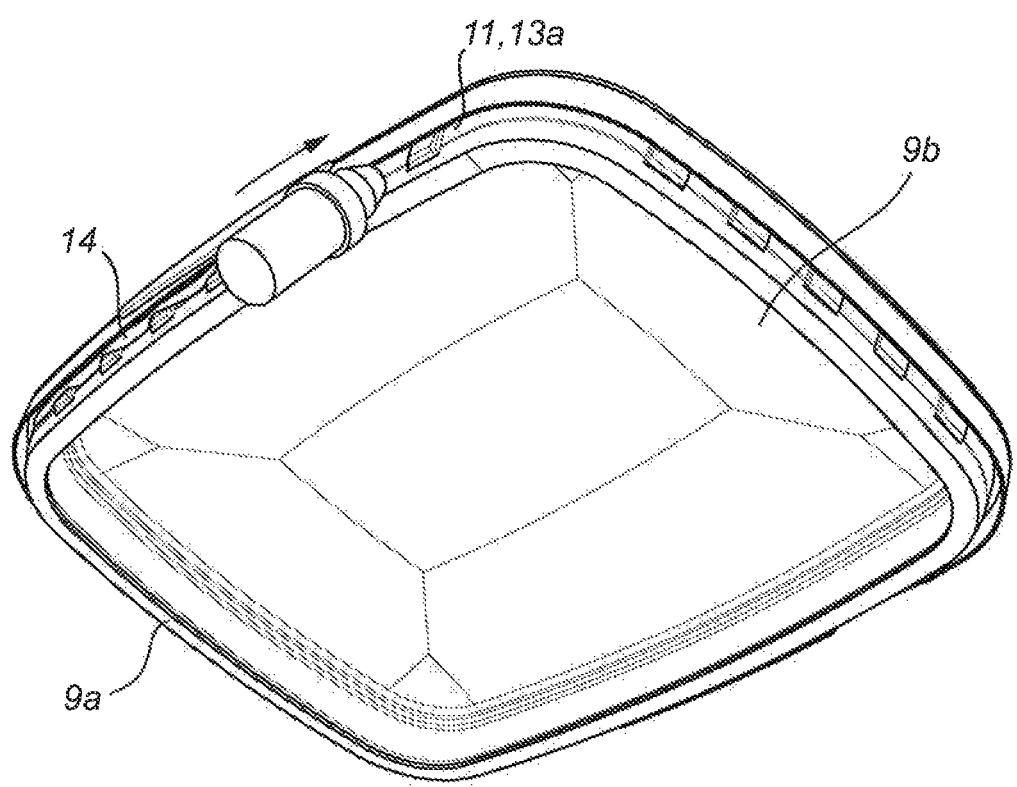
FIG. 8 illustrates application of adhesive to the rim.

FIG. 8 illustrates a step of applying a first adhesive layer 14 comprising a thermoplastic adhesive, to the first connecting portion 11, in this figure also corresponding to the first side wall section 13a. The first adhesive layer 14 is applied around the entire circumference of the first connecting portion 11 of the rim, the first connecting portion 11 extending around the entire circumference of the tubular body end portion when being applied to the tubular body.

Figure 9:
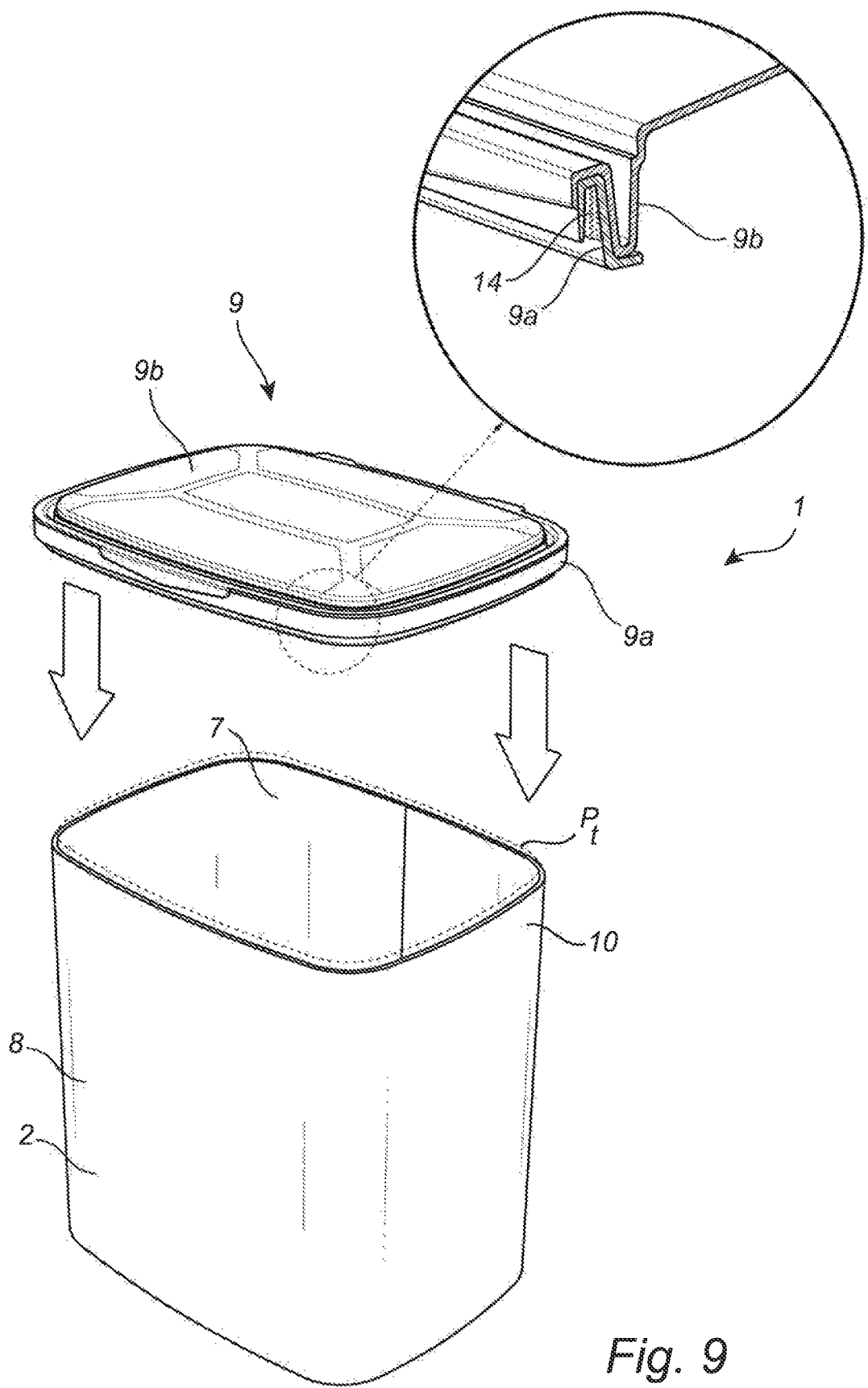
FIG. 9 illustrates attaching the rim to the tubular body and thereby forming a composite paperboard container prepared by the method according to the present disclosure.

FIG. 9 illustrates a final step of attaching the rim component 9 comprising a rim part 9a and a lid part 9b to the end portion 10 of the tubular body 2. The adhesive layer 14 is arranged facing the inner surface 7 of the tubular body 2.

The invention claimed is:

1. A composite paperboard container for bulk solids, the composite paperboard container comprising a tubular body having a bottom end over a container bottom opening) opposite a container top opening at a top end of the tubular body, the tubular body having an inner surface facing towards an interior of the tubular body and an outer surface facing away from the interior of the tubular body, the tubular body extending in a longitudinal direction between the bottom end and the top end, the composite container comprises a rim surrounding one of the container top opening and the container bottom opening, the container top opening having a top opening perimeter and the container bottom opening having a bottom opening perimeter, the rim being attached with a first connecting portion of the rim to an end portion of the tubular body along an end edge of the tubular body, the tubular body being made from a laminate sheet material comprising a carton substrate layer, the rim is a molded rim comprising fibers, the fibers being pulp fiber, the rim is connected to the tubular body by at least one adhesive layer, the at least one adhesive layer comprising a thermoplastic adhesive and is arranged in a first gap between the first connecting portion of the rim and the end portion of the tubular body, the at least one adhesive layer comprises thermoplastic adhesive in an amount of from 0.1 mg per mm of one of the container top opening perimeter and the container bottom opening perimeter at the end portion of the tubular body.

2. The composite paperboard container according to claim 1, wherein the first connecting portion of the rim has a first distal edge and the first distal edge of the first connecting portion is located at a distance from the end edge of the tubular body, the distance being within the range of from 5 mm to 50 mm.

3. The composite paperboard container according to claim 2, wherein a circumferential area of the tubular body facing the first connecting portion of the rim and extending from the end edge of the tubular body of at least 4 mm, towards the opposite end edge is covered with the first adhesive layer.

4. The composite paperboard container according to claim 1, wherein the first connecting portion faces the inner surface of the tubular body and the rim comprises a second connecting portion facing the outer surface of the tubular body, the rim furthermore being connected to the tubular body by a second adhesive layer applied on the outer surface of the tubular body, the second adhesive layer comprises a thermoplastic adhesive is arranged in a second gap between the second connecting portion of the rim and the end portion on the outer surface of the tubular body.

5. The composite paperboard container according to claim 1, wherein the rim surrounds the container top opening and is a rim component comprising a rim part and lid part, wherein the rim part and the lid part are moulded in one piece, the rim part) being connected to the lid part via a hinge portion.

6. The composite paperboard container according to claim 1, wherein the composite paperboard container is free from plastic components attached to the tubular body.

7. The composite paperboard container according to claim 1, wherein the rim has a density within the range of from 0.2 to 1.5 kg/dm$^3$.

8. The composite paperboard container according to claim 1, wherein the rim comprises a U-shaped track portion comprising a first and a second side wall section and a bottom section facing the end edge of the tubular body and connecting the first and the second side wall sections, and wherein a draft angle, between the bottom section and the first side wall section, is within the range of from zero to ten degrees.

9. The composite paperboard container according to claim 1, wherein the rim comprises an L-shaped connecting portion comprising a first side wall section and a bottom section facing the end edge of the tubular body, and wherein a draft angle, between the bottom section and the first side wall section is within the range of from zero to ten degrees.

10. The composite paperboard container according to claim 1, wherein the first connecting portion is provided with distance elements extending in the longitudinal direction, the distance elements facing the tubular body.

11. The composite paperboard container according to claim 1, wherein the first connecting portion comprises a first wall section and a guiding side wall section, the guiding side wall section extending from the first wall section, the guiding side wall section having a greater distance to the tubular body compared to the first wall section.

12. A method of producing a composite paperboard container for bulk solids, the method comprising the steps of:
  a) bending a paperboard laminate sheet material comprising a carton substrate layer into a tube, the tube having a longitudinal direction, closing the tube in the longitudinal direction by joining overlapping or abutting side edges of the paperboard material thereby forming a tubular body, the tubular body having an inner surface facing towards an interior of the tubular body and an outer surface facing away from the interior of the tubular body;
  b) imparting a predetermined cross-sectional shape to said tube;
  (c) closing the tubular body at a bottom end over a container bottom opening opposite a container top opening at a top end of the tubular body;
  (d) providing pulp fibers into a molding tool thereby forming a three-dimensionally shaped rim component comprising fibers, the fibers being pulp fiber, the rim comprising a connecting portion having a distal edge;
  (e) providing at least one adhesive layer, comprising a thermoplastic adhesive, to the first connecting portion of the rim in an amount of from 0.1 mg per mm of a container opening perimeter at the end portion; and
  (f) adhesively attaching the rim to the end portion, thereby adhesively attaching the rim to the tubular body.

13. The method according to claim 12, wherein the rim has a density within the range of from 0.2 to 1.5 kg/dm$^3$.

14. The method according to claim 12, wherein the rim formed in step d) comprises a U-shaped track portion comprising a first and a second side wall section and a bottom section facing the end edge of the tubular body, and wherein step e) includes arranging the rim such that the bottom section faces the end edge of the tubular body, and wherein a draft angle, between the bottom section and the first side wall section, is within the range of from zero to five degrees.

15. The method according to claim 12, wherein the rim formed in step d) comprises an L-shaped connecting portion comprising a first side wall section and a bottom section facing the end edge of the tubular body, and wherein a draft angle, between the bottom section and the first side wall section, is within the range of from zero to five degrees.

16. The method according to claim 12, wherein in the rim formed in step d) the first connecting portion comprises a first wall section and a guiding side wall section, the guiding side wall section extending from the first wall section, the guiding side wall section having a larger distance to the tubular body compared to the first wall section.

17. The method according to claim 12, wherein the first connecting portion is provided with distance elements extending in the longitudinal direction, the distance elements facing the tubular body.

* * * * *